Sept. 20, 1960 W. A. WEAVER 2,953,034
REDUCTION GEARING AND CLUTCH COMBINATION
Filed Sept. 21, 1959 3 Sheets-Sheet 1

Sept. 20, 1960 W. A. WEAVER 2,953,034
REDUCTION GEARING AND CLUTCH COMBINATION
Filed Sept. 21, 1959 3 Sheets-Sheet 2

United States Patent Office 2,953,034
Patented Sept. 20, 1960

2,953,034
REDUCTION GEARING AND CLUTCH COMBINATION

William Arthur Weaver, Stockton House, Stockton, near Rugby, Warwickshire, England Filed Sept. 21, 1959, Ser. No. 841,189

10 Claims. (Cl. 74—376)

The invention relates to a reduction gearing providing a reverse drive and incorporating a fluid-operated clutch having a neutral position and for selectively driving either of two coaxial shafts from a coaxial input shaft.

According to the invention a reduction gearing comprises an input shaft, a first driving shaft and a second driving shaft, said driving shafts coaxial with each other and with said input shaft, an output shaft parallel with said input and driving shafts, first and second driving gear wheels respectively fast with said driving shafts, a first and a second driven gear wheel fast with the output shaft, said first and second driving gear wheels having respective driving relationships with said first and second driven gear wheels and adapted to drive said output shaft at alternative ratios, respective driven clutch elements coaxially fast with said first and second driving gear wheels, a driving clutch element slidably but relatively non-rotatively mounted on said input shaft in a position intermediate said driven clutch elements, and means between said driven clutch elements for urging said driving clutch member into operative engagement with a selected one of the driven clutch elements.

Such means can be hydraulic or pneumatic, and in that case said driving clutch element can define with each said driven clutch element a working chamber, and means would be provided for applying fluid pressure selectively to said working chambers whereby the pressure acting in the selected working chamber will urge said driving clutch member into operative engagement with the driven clutch member forming part of the other working chamber.

According to a further feature the driving friction-clutch member includes a pair of coaxial, truncated-conical friction elements, having their smaller diameter ends facing axially-outwardly, mounted from the exterior of a ring member which is sealingly and slidably mounted from the outer periphery of a cylindrical member fast with the input shaft, the outer periphery of the cylindrical member, in a position covered by the ring member, being provided with an annular channel into which sealingly extends a radially-inwardly extending annular flange of the ring member, whereby to divide the channel into two working chambers to be connected in a hydraulic circuit such that when one of the chambers is connected to a hydraulic pressure supply, and the other chamber is connected to exhaust, the ring member will be slid in the appropriate axial direction into engagement with the appropriate one of a pair of driven, frusto-conical, friction elements which are respectively fast with the driving shafts and are arranged at opposite ends of the ring member with their larger diameter ends facing each other.

In such a case, and according to a still further feature, one driving shaft is tubular and has the other driving shaft extending through it, and the input end of the outer driving shaft is fast with a cup-like member having the associated driven friction element fast within its open end, the input end of the inner driving shaft also being fast with a cup-like member, contained within that first mentioned and having its lip axially inwardly of the lip thereof, having the associated driven friction element fast within its open end.

According to a still further feature the clutch is mounted intermediate the alternative driving gear wheels, the two coaxial driving shafts being hollow and journalled on the input shaft so as to extend away from each other, each driving shaft being rotatively fast with a respective one of the driving gear wheels.

The pressure, and exhaust paths of the hydraulic circuit can extend through respective ducts in the cylindrical member and input shaft to respective annuli, in a stationary bearing for the input shaft, connected to the inlet and outlet of a pump means. Such a pump means can include a pump driven from the input shaft through gearing.

Figure 1:
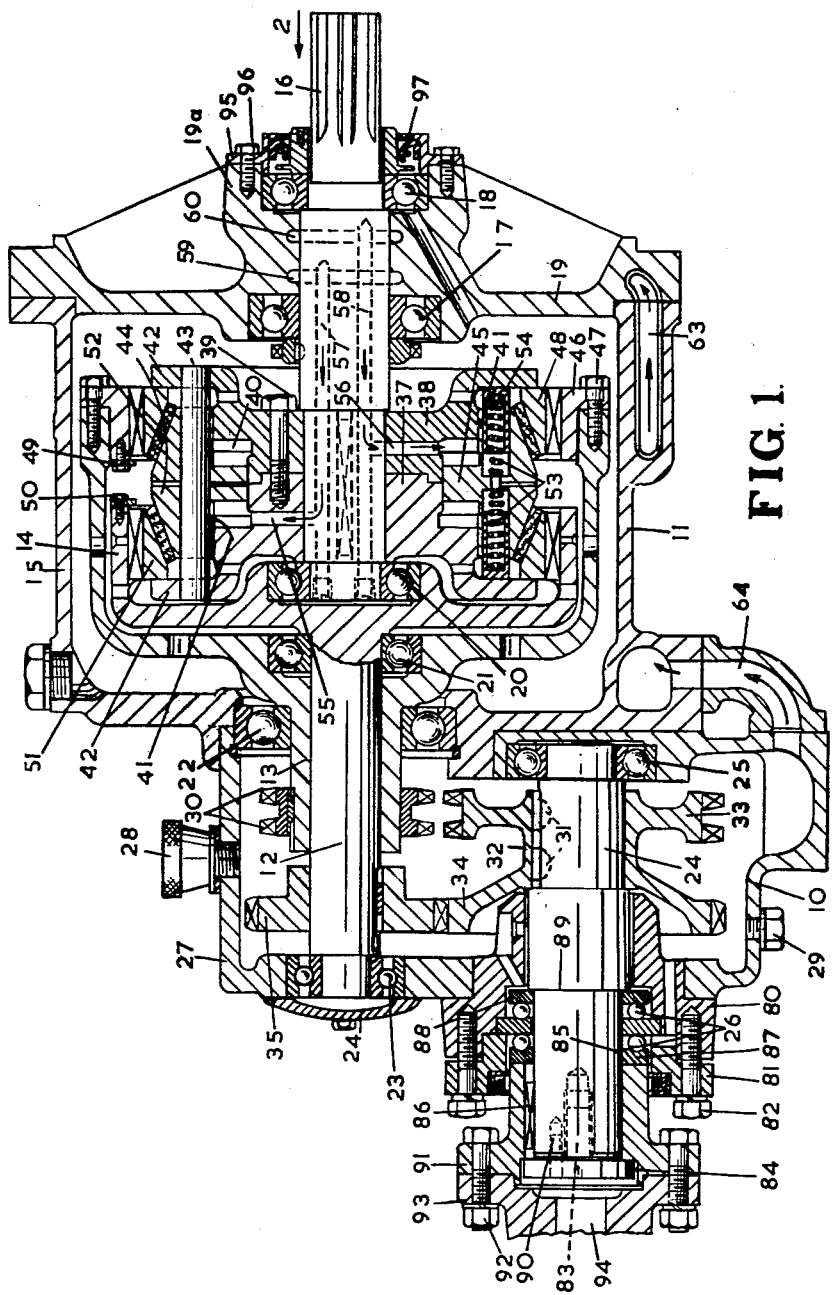
Figure 1 is a longitudinal section, taken on the line 1—1 of Figure 2, through one form of the gearing in which the clutch and the reversing reduction gearing are accommodated in separate casings.

Referring to Figure 1, the reversing reduction gearing is accommodated in a casing 10, and the clutch mechanism in a casing 11.

The gearing includes inner and outer coaxial shafts 12 and 13 which are respectively fast with cup-like members 14 and 15 within the casing 11, and the latter contains an aligned input shaft 16. The input shaft is supported in two bearings 17 and 18 mounted from a detachable end wall 19 of casing 11, and the inner end of shaft 16 is supported in a bearing 20 mounted in the centre of cup-like member 14. Driving shaft 12, where it adjoins cup-like member 14, is supported in a bearing 21 mounted at the centre of cup-like member 15; and driving shaft 13, where it adjoins cup-like member 15, is supported in a bearing 22 mounted in an opposite end wall of casing 11. The further end of driving shaft 12 is supported by a bearing 23 mounted in a cap 24 spigoted into the casing 10.

The output shaft of the gearing is indicated at 24, having its inner end supported in a journal bearing 25 and its outer end supported in a combined journal and thrust bearing indicated generally at 26.

Casing 10 is provided with a removable lid 27 having an oil filler 28, and with a drain plug 29.

Fast on driving shaft 13 is a double chain sprocket 30, and the output shaft has keyed to it at 31 a sleeve 32 having a coacting chain sprocket 33 fast with one end. The other end of the sleeve 32 is integral with a gear wheel 34 which meshes a gear wheel 35 fast on driving shaft 12.

Keyed at 36 to a reduced-diameter portion of the input shaft 16 is a cylindrical member comprising two portions 37, 38 secured together by screws 39, and the outer peripheries of the portions 37, 38 are formed to provide an annular channel 40 between two cylindrical surfaces 41 flanked by radially-extending annular flanges 42. A plurality of pins 43 uniting these flanges slidably support a ring member 44 of which the outer periphery is tapered towards each end as shown, and of which the inner periphery is stepped to provide a central, piston-like flange 45 flanked by cylindrical surfaces guidingly and sealingly supported from the surfaces 41 of the cylindrical member.

The inner periphery of the piston-like flange 45 makes sealing contact with the inner periphery of the annular channel 40 and thus divides it into two, axially-spaced working chambers such that when a hydraulic pressure is applied, as hereinafter described, in one of them the ring member can be slid axially.

Cup-like member 15 has an internally splined ring 46 made fast with its lip by a circle of screws 47. A clutch cone ring 48 has coacting splines to engage within the ring 46 and can slide relatively thereto within the limits imposed by the adjacent flange 42 and a retaining ring 49 held in position on the ring 46 by a circle of screws 50.

Cup-like member 14 is of less axial extent than the member 15 and its lip is internally splined to receive a clutch cone ring 51 which can slide between the limits imposed by the adjacent flange 42 and a retaining ring 49 held in position by a circle of screws as shown.

The clutch cone rings 48 and 51, or the conical exterior surfaces of the ring member 44 with which they respectively coact, or both, are shod with anti-friction material 52.

In order to provide a neutral position for the clutch the ring member 44 is biased to a central position, in which it is clear of the clutch cone rings, by a circular arrangement of compression springs 53 which are housed in thimbles 54 reacting on the adjacent faces of the flanges 42.

It will be seen that by admitting hydraulic pressure to either working chamber the ring member 44 will be urged in the opposite direction to establish a driving relationship with the appropriate one of the clutch cone rings 48 or 51, and for this purpose the working chambers have respective radial ducts 55, 56 which communicate, through respective axial ducts 57, 58 in shaft 16, with axially-spaced annular galleries 59, 60 formed in the bore of a hub portion 19a of the end plate 19.

Mounted on the portion removed by the section in Figure 1 (see Figures 2 and 3) is a gear-type pump 61 which derives its supply of hydraulic fluid through ducts 62 (Figure 2) and 63, 64 (Figure 1) from near the bottom of the casing 10. The pump delivers through radial and axial ducts 65, 66 to a control valve, which comprises a body 67 and a movable member 68 and is presently to be described, and thence either to the gallery 59 through axial and radial ducts 69, 70 or to the gallery 60 through axial and radial ducts 71, 72, according to the setting of the control valve. A safety valve in the pump delivery duct 66 is indicated generally at 73.

The control valve body is interiorly provided with pockets 74, 75, 76 and 77 with which respectively communicate the ducts 69, 66, 71 and a return duct 78 leading to the casing 10. In the position shown in Figure 3 the pump delivery along duct 66 is bypassing movable valve member 68 by flowing through the pockets 74, 76 and is flowing through the return duct 78, to provide a neutral position in which the hydraulic forces on the opposite faces of piston-like flange 45 are balanced and the clutch is disengaged.

Figure 3:
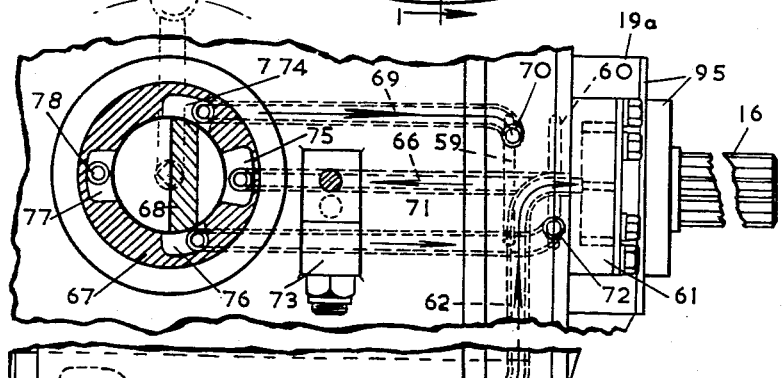
Figure 3 is a section on the line 3—3 of Figure 2.

A clockwise movement in Figure 3 of a control lever 79 so as to move valve member 68 to a position in which it effects seals between pockets 74 and 75, and between pockets 76 and 77, causes the pump delivery to pass through ducts 71 and 72 to gallery 60 and thence through ducts 58 and 56 to the right-hand working chamber in Figure 1. This urges ring member 44 to the left to clutch input shaft 16 to driving shaft 12, and at the same time hydraulic fluid in the left-hand working chamber is expressed through ducts 55 and 57 to gallery 59 and from thence through ducts 70 and 69 to the space within valve body 67 which communicates with the return duct 78.

A counter-clockwise movement of lever 79 to the position in which valve member 68 effects seals between pockets 74 and 77, and between pockets 75 and 76 causes, in a manner which will readily be understood, the ring member to move to the right of Figure 1 for clutching input shaft 16 to driving shaft 13.

It will be seen that when driving shaft 12 is clutched to the input shaft 16, the gear pair 34, 35 will drive output shaft 24 in the opposite sense, while when driving shaft 13 is clutched to the input shaft the output shaft will be driven in the same sense through sprockets 30 and 33 and the drive transmission chain (not shown) which entrains them. The gear pair, and the sprockets can be so proportioned as to provide different reduction ratios, or alternatively a direct 1 to 1 ratio drive could be taken from shaft 12.

Figure 1 shows that the thrust bearing 26 is supported in a part 80, spigotally fitting in the adjacent wall of the casing 10, and in a ring 81 which is held to the said part by a circle of screws 82. The outer end of the output shaft is internally screw-threaded to receive a screw 83 of which the head 84 abuts an internal shoulder of a coupling 85, splined to the output shaft at 86, so as to urge its inner end up to the outermost race 87 of the thrust bearing, the innermost race 88 being thereby urged up to a shoulder 89 of the output shaft. When the screw 83, 84 has been turned for adjusting the thrust bearing it is locked in position by a set-screw 90 extending through its head 84 and into the adjacent end of the output shaft. The coupling has a flange 91 by which it can be bolted at 92 to a corresponding flange 93 of a final drive shaft 94.

Figure 2:
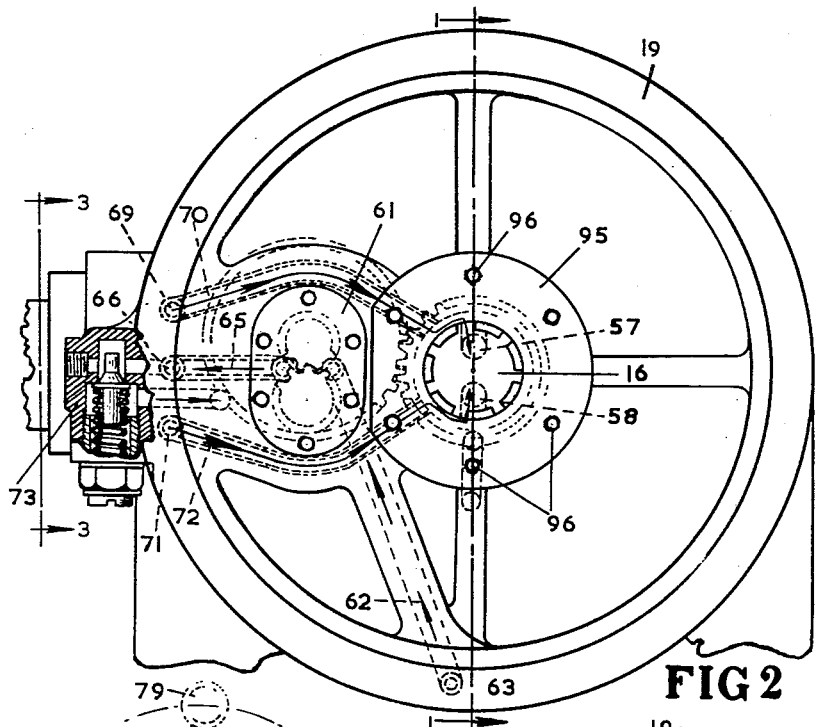
Figure 2 is an elevation looking in the direction of the arrow 2 in Figure 1.

It will be seen from Figures 1 and 2 that the bearing 18 for shaft 16 is located by a plate 95 which is held in position by screws 96 and also holds an oil seal 97 in position.

Figure 4:
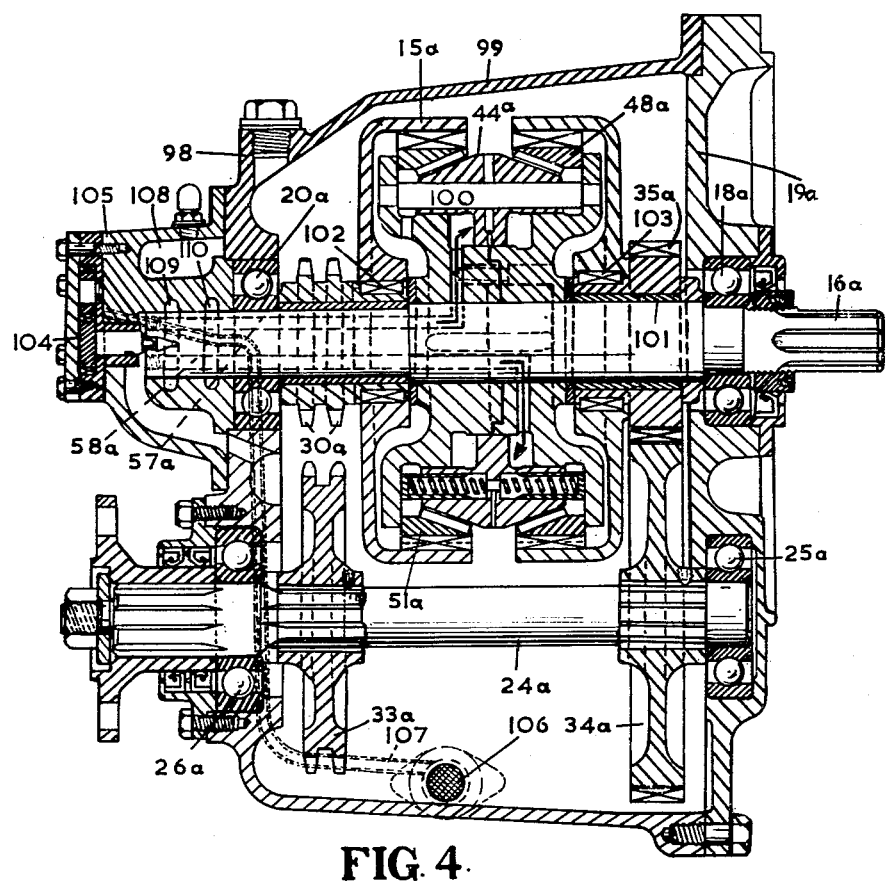
Figure 4 is a longitudinal section through another form of the gearing in which the reversing reduction gearing, and a modified form of the clutch, are incorporated as a unit in a single casing.

Referring now to the construction shown in Figure 4, in which like parts are denominated by similar reference characters, the input shaft 16a is journalled at 18a and 20a in an integral end wall 98, and a detachable end wall 19a of a casing 99, and an output shaft 24a is journalled at 25a and 26a in the same end walls.

Journalled on the input shaft, with intervening bearing liners 100, 101 are a chain sprocket 30a and a spur gear wheel 35a, the sprocket driving (through a transmission chain, not shown) a driven sprocket 33a fast with the output shaft, and the spur gear meshing a driven spur gear wheel 34a which is also fast with the output shaft.

The sprocket 30a and spur wheel 35a have respective splined connections 102 and 103 with the cup-like members 15a and 14a of the clutch, these cup-like members facing each other instead of being nested one within the other as in the construction according to Figure 1. The remaining parts of the clutch are as previously described; and the arrangement is such that with cone ring 48a clutched to shaft 16a the gear pair 35a, 34a will drive the output shaft 24a at one ratio and in the reverse direction as compared with the input shaft, whereas when cone ring 51a is clutched to the input shaft the output shaft 24a will be driven in the same direction at a different ratio by the sprockets 30a and 33a and the chain which entrains them.

A portion of the hydraulic circuit is also shown in Figure 4, comprising a gear-type pump 104 in a casing 105 attached by bolts (not shown) to the exterior of the end wall 98 and driven from the input shaft 16a. The pump takes its supply through a filter 106 and pipe 107 from the bottom of the casing 99 and delivers into an annular chamber 108. The hydraulic fluid from the latter is delivered to a control valve (not shown) of which the inlet and delivery are reversibly connected to ducts 57a, 58a, in the input shaft, through annular grooves 109, 110, for operating the clutch as previously described.

It will be understood that the embodiments of the invention described above are by way of example only, and that modifications thereof are within the scope of the invention. For example, flat clutch plates could be used instead of frusto-conical ones, and electro-magnetically operated means could be used instead of the hydraulically-operated means for operating the clutch.

What I claim as my invention and desire to secure by Letters Patent of the United States is:

1. A reduction gearing comprising an input shaft, a first driving shaft and a second driving shaft, said driving shafts coaxial with each other and with said input shaft, an output shaft parallel with said input and driving shafts, first and second driving gear wheels respectively fast with said driving shafts, a first and a second driven gear wheel fast with the output shaft, said first and second driving gear wheels having respective driving relationships with said first and second driven gear wheels and adapted to drive said output shaft at alternative ratios, respective driven clutch elements coaxially fast with said first and second driving gear wheels, a driving clutch element slidably but relatively non-rotatively mounted on said input shaft in a position intermediate said driven clutch elements, said driving clutch element defining with each said driven clutch element a working chamber, and means for applying fluid pressure selectively to said working chambers whereby the pressure acting in the selected working chamber will urge said driving clutch member into operative engagement with the driven clutch member forming part of the other working chamber.

2. A reduction gearing comprising an input shaft, a first driving shaft and a second driving shaft, one of said driving shafts being tubular and arranged coaxially about the other, said driving shafts coaxial with said input shaft, an output shaft parallel with said input and driving shafts, first and second driving gear wheels respectively fast with said driving shafts, a first and a second driven gear wheel fast with the output shaft, said first and second driving gear wheels having respective driving relationships with said first and second driven gear wheels and adapted to drive said output shaft at alternative ratios, respective driven clutch elements coaxially fast with said first and second driving shafts, a driving clutch element slidably but relatively non-rotatively mounted on said input shaft in a position intermediate said driven clutch elements, said driving clutch element defining with each said driven clutch element a working chamber, and means for applying fluid pressure selectively to said working chambers whereby the pressure acting in the selected working chamber will urge said driving clutch member into operative engagement with the driven clutch member forming part of the other working chamber.

3. A reduction gearing comprising an input shaft, a first driving shaft and a second driving shaft, one of said driving shafts being tubular and arranged coaxially about the other, said driving shafts coaxial with said input shaft, an output shaft parallel with said input and driving shafts, a driving sprocket wheel fast on said first driving shaft, a driving gear wheel fast with said second driving shaft, a driven sprocket wheel and a driven gear wheel fast with the output shaft, said driving and driven sprocket wheels being co-planar, a drive transmission chain entraining said driving and driven sprocket wheels, said driving gear wheel meshing said driven gear wheel, said sprocket wheels and said gear wheels adapted to drive said output shaft at alternative ratios, respective driven clutch elements coaxially fast with said first and second driving shafts, a driving clutch element slidably but relatively non-rotatively mounted on said input shaft in a position intermediate said driven clutch elements, said driving clutch element defining with each said driven clutch element a working chamber, and means for applying fluid pressure selectively to said working chambers whereby the pressure acting in the selected working chamber will urge said driving clutch member into operative engagement with the driven clutch member forming part of the other working chamber.

4. A reduction gearing comprising a first casing, a first driving shaft and a second driving shaft journalled in said casing, one of said driving shafts being tubular and arranged coaxially about the other, an output shaft parallel with said driving shafts, a driving sprocket wheel fast on said first driving shaft, a driving gear wheel fast with said second driving shaft, a driven sprocket wheel and a driven gear wheel fast with the output shaft, said driving and driven sprocket wheels being co-planar, a drive transmission chain entraining said driving and driven sprocket wheels, said driving gear wheel meshing said driven gear wheel, said sprocket wheels and said gear wheels adapted to drive said output shaft at alternative ratios, a second casing, said first and second driving shafts extending into said second casing, an input shaft journalled in said second casing coaxially with said driving shafts, respective driven clutch elements within said second casing and coaxially fast with portions of said driving shafts which extend into said second casing, a driving clutch element slidably but relatively non-rotatively mounted on said input shaft in a position intermediate said driven clutch elements, said driving clutch element defining with each said driven clutch element a working chamber, and means for applying fluid pressure selectively to said working chambers whereby the pressure acting in the selected working chamber will urge said driving clutch member into operative engagement with the driven clutch member forming part of the other working chamber.

5. A reduction gearing comprising a first casing, a first driving shaft and a second driving shaft journalled in said casing, one of said driving shafts being tubular and arranged coaxially about the other, an output shaft parallel with said driving shafts, a driving sprocket wheel fast on said first driving shaft, a driving gear wheel fast with said second driving shaft, a driven sprocket wheel and a driven gear wheel fast with the output shaft, said driving and driven sprocket wheels being co-planar, a drive transmission chain entraining said driving and driven sprocket wheels, said driving gear wheel meshing said driven gear wheel, said sprocket wheels and said gear wheels adapted to drive said output shaft at alternative ratios, a second casing, said first and second driving shafts extending into said second casing, an input shaft journalled in said second casing coaxially with said driving shafts, respective driven clutch elements within said second casing and coaxially fast with portions of said driving shafts which extend into said second casing, said driven clutch elements being cup-like with their open ends facing each other, outwardly divergent friction rings supported within the open ends of the cup-like driven clutch elements, said driven clutch elements being axially spaced from each other, a driving clutch element comprising a hub member with a peripheral element, said driving clutch element comprising a hub member with a peripheral channel slidably but relatively non-rotatively mounted on said input shaft, in a position intermediate said driven clutch elements, and a ring slidably mounted on the periphery of said hub member, said ring provided at its ends with outwardly convergent friction cones for coaction with said friction rings, said slidable ring having a radially-inwardly directed flange at its inner periphery extending into the peripheral channel of said hub member to define two working chambers, and means for applying fluid pressure selectively to said working chambers whereby the pressure acting in the selected working chamber will urge said slidable ring for a said friction cone thereon operatively to engage the friction ring of the driven clutch member adjacent the other working chamber.

6. A reduction gearing, according to claim 5, in which the hub member is formed with a radially-extending flange at each end, said flanges being interconnected by parallel guide pins extending through holes in the slidable ring, and resilient means reacting between the said flanges and slidable ring are provided for biasing the said ring into a neutral position in which neither of its friction cones will engage the friction rings of the driven clutch members.

7. A reduction gearing comprising a casing, an input shaft journalled in said casing, a first tubular driving shaft and a second tubular driving shaft journalled in axially-spaced relationship on said input shaft, an output shaft journalled in said casing and parallel with said driving and input shafts, first and second driving gear wheels respectively fast with said driving shafts, a first and a second driven gear wheel fast with the output shaft, said first and second driving gear wheels having respective driving relationships with said first and second driven gear wheels and adapted to drive said output shaft at alternative ratios, respective driven clutch elements coaxially fast with said first and second driving shafts at their adjacent ends, a driving clutch element slidably but relatively non-rotatively mounted on said input shaft in a position intermediate said driven clutch elements, said driving clutch element defining with each said driven clutch element a working chamber, and means for applying fluid pressure selectively to said working chambers whereby the pressure acting in the selected working chamber will urge said driving clutch member into operative engagement with the driven clutch member forming part of the other working chamber.

8. A reduction gearing comprising a casing, an input shaft journalled in said casing, a first tubular driving shaft and a second tubular driving shaft journalled in axially-spaced relationship on said input shaft, an output shaft journalled in said casing and parallel with said driving and input shafts, a driving sprocket wheel fast on said first driving shaft, a driving gear wheel fast with said second driving shaft, a driven sprocket wheel and a driven gear wheel fast with the output shaft, said driving and driven sprocket wheels being co-planar, a drive transmission chain entraining said driving and driven sprocket wheels, said driving gear wheel meshing said driven gear wheel, said sprocket wheels and said gear wheels adapted to drive said output shaft at alternative ratios, respective driven clutch elements coaxially fast with said first and second driving shafts at their adjacent ends, a driving clutch element slidably but relatively non-rotatively mounted on said input shaft in a position intermediate said driven clutch elements, said driving clutch element defining with each said driven clutch element a working chamber, and means for applying fluid pressure selectively to said working chambers whereby the pressure acting in the selected working chamber will urge said driving clutch member into operative engagement with the driven clutch member forming part of the other working chamber.

9. A reduction gearing comprising a casing, an input shaft journalled in said casing, a first tubular driving shaft and a second tubular driving shaft journalled in axially-spaced relationship on said input shaft, an output shaft journalled in said casing and parallel with said driving and input shafts, a driving sprocket wheel fast on said first driving shaft, a driving gear wheel fast with said second driving shaft, a driven sprocket wheel and a driven gear wheel fast with the output shaft, said driving and driven sprocket wheels being co-planar, a drive transmission chain entraining said driving and driven sprocket wheels, said driving gear wheel meshing said driven gear wheel, said sprocket wheels and said gear wheels adapted to drive said output shaft at alternative ratios, respective driven clutch elements coaxially fast with said first and second driving shafts at their adjacent ends, said driven clutch elements being cup-like with their open ends facing each other, outwardly divergent friction rings supported within the open ends of the cup-like driven clutch elements, said driven clutch elements being axially spaced from each other, a driving clutch element, said driving clutch element comprising a hub member with a peripheral channel slidably but relatively non-rotatively mounted on said input shaft, in a position intermediate said driven clutch elements, and a ring slidably mounted on the periphery of said hub member, said ring provided at its ends with outwardly convergent friction cones for coaction with said friction rings, said slidable ring having a radially-inwardly directed flange at its inner periphery extending into the peripheral channel of said hub member to define two working chambers, and means for applying fluid pressure selectively to said working chambers whereby the pressure acting in the selected working chamber will urge said slidable ring for a said friction cone thereon operatively to engage the friction ring of the driven clutch member adjacent the other working chamber.

10. A reduction gearing, according to claim 6, in which the hub member is formed with a radially-extending flange at each end, said flanges being interconnected by parallel guide pins extending through holes in the slidable ring, and resilient means reacting between the said flanges and slidable ring are provided for biasing the said ring into a neutral position in which neither of its friction cones will engage the friction rings of the driven clutch members.

References Cited in the file of this patent

UNITED STATES PATENTS

| | | |
|---|---|---|
| 850,247 | Petri | Apr. 16, 1907 |
| 2,314,549 | Milbrath | Mar. 23, 1943 |
| 2,325,647 | Adamson | Aug. 3, 1943 |
| 2,462,457 | Berndtson | Feb. 22, 1949 |